United States Patent [19]

Gilmore

[11] 3,725,771
[45] Apr. 3, 1973

[54] STATIC CONTROL FOR STEP VOLTAGE REGULATOR

[75] Inventor: Thomas P. Gilmore, Wauwatosa, Wis.

[73] Assignee: Allis-Chalmers Corporation, Milwaukee, Wis.

[22] Filed: Sept. 16, 1971

[21] Appl. No.: 181,076

[52] U.S. Cl. ............... 323/20, 318/624, 318/650, 318/672, 318/678, 323/22 Z, 323/43.5 S, 323/45
[51] Int. Cl. ............................................... G05f 1/20
[58] Field of Search ...... 307/236, 288; 318/624, 650, 318/672, 674, 678; 323/20, 22 TZ, 43.5 S, 45; 330/69

[56] References Cited

UNITED STATES PATENTS

| | | | |
|---|---|---|---|
| 3,252,078 | 5/1966 | Conner | 323/47 X |
| 3,430,053 | 2/1969 | Westhaver | 318/624 X |
| 3,522,521 | 8/1970 | Lloyd | 323/22 T |
| 3,566,145 | 2/1971 | Goodale | 307/236 X |

FOREIGN PATENTS OR APPLICATIONS 1,233,055  1/1967  Germany ...................... 323/22 Z Primary Examiner—A. D. Pellinen
Attorney—Lee H. Kaiser et al.

[57] ABSTRACT

A control for a step voltage regulator having a reversible motor for actuating a tap changer switch to vary the regulator output voltage when a "raise" or a "lower" signal respectively is applied thereto, includes a potential sensing transformer for deriving a sample DC voltage proportional to the regulator output voltage, a zener diode for deriving a DC reference voltage of opposite polarity to said sample voltage, a summing operational amplifier which receives the sample and the reference voltages on its inverting input, a polarity and magnitude sensor including a pair of oppositely-poled, serially-arranged zener diodes coupled to the output of the summing amplifier and a NPN and PNP transistor having commoned bases coupled to the pair of zener diodes for deriving raise and lower signals when the output voltage from the summing amplifier is of predetermined magnitude and of opposite polarity, and a rheostat for varying the gain of the summing amplifier to thereby regulate the voltage bandwidth within which the output voltage of the step regulator is maintained.

32 Claims, 2 Drawing Figures

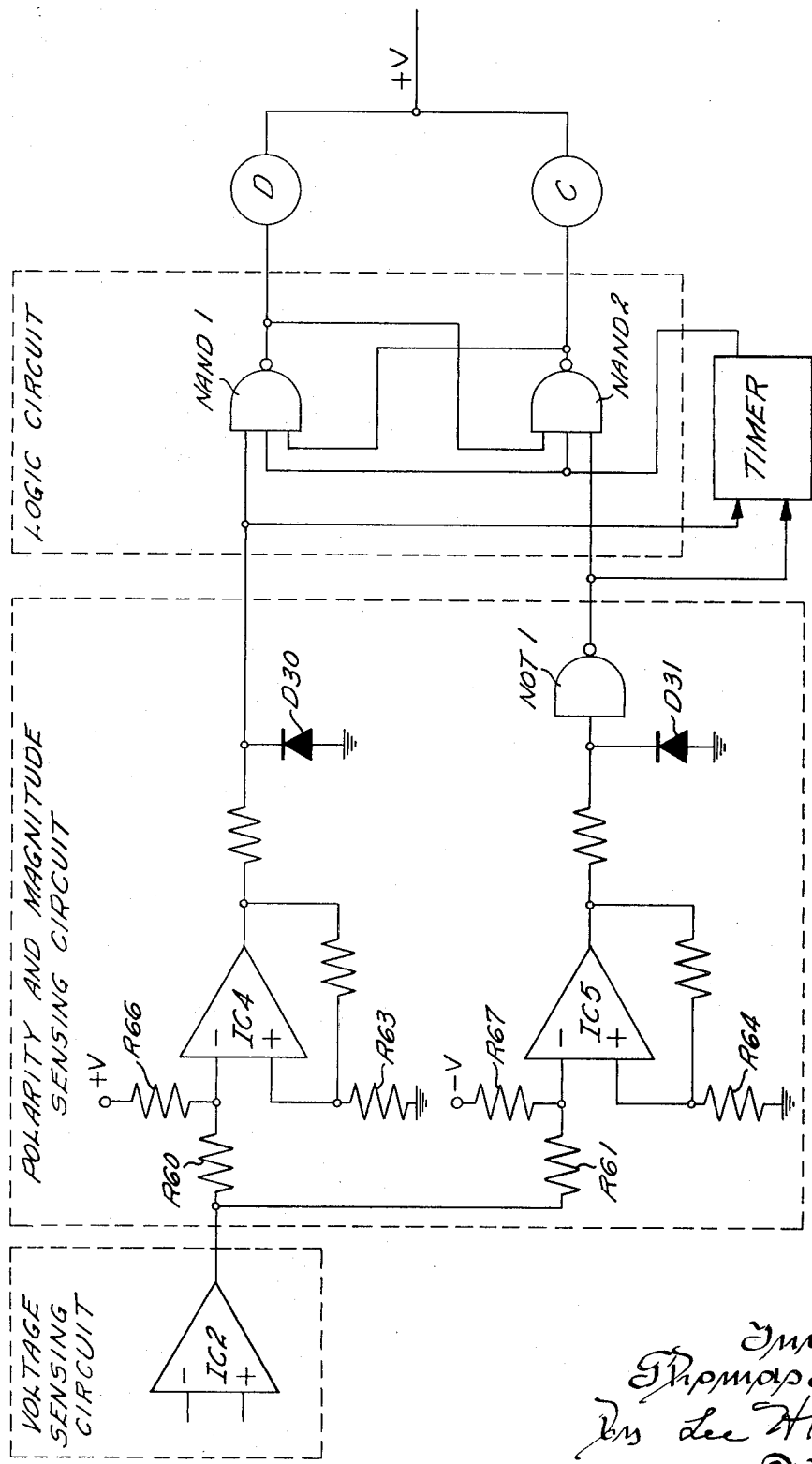

STATIC CONTROL FOR STEP VOLTAGE REGULATOR

This invention relates to a control for a step voltage regulator and in particular to a static system for controlling the reversible motor which actuates the movable tap changer contacts of a step voltage regulator.

BACKGROUND OF THE INVENTION

A step voltage regulator is an autotransformer provided with load ratio control equipment for regulating the voltage of the feeder or bus to which it is connected. The step voltage regulator may have a 100 percent exciting winding in shunt with the line on the source side and normally maintains the voltage on the load side within a desired voltage bandwidth by a 10 percent tapped buck/boost winding on the load side in series with the line. The 10 percent series winding has taps connected to a tap changer switch which is driven by a reversible motor and usually provides the ability to change the effective turns ratio from input to output plus or minus 10 percent in 32 steps of five-eighths percent voltage.

Static controls for step regulators are known which sense the voltage on the load side and complete an energizing circuit when the load voltage is beyond the upper or lower bandwidth limit to drive the tap changer motor in the direction to again bring the voltage within the bandwidth. Certain prior art static controls for step voltage regulators use magnetic amplifier voltage sensing means, such as disclosed in U.S. Pat. No. 3,184,677 to J. E. Jacobsen, which makes them relatively large and costly, while other known static controls are not ideal for use on feeder voltage regulators in remote locations because they require field calibration and periodic maintenance and further because the voltage level setting and testing is relatively difficult.

OBJECTS OF THE INVENTION

It is an object of the invention to provide an improved static control for a step voltage regulator which is simpler in structure, smaller in size, and lower in cost than known devices. It is a further object of the invention to provide such an improved step regulator static control which is more stable and more reliable, yet easier to adjust, than prior art apparatus. A still further object is to provide such an improved static control for a step regulator which eliminates warm-up time and field calibration, minimizes periodic maintenance, and permits easy setting of voltage bandwidth. Another object of the invention is to provide such an improved static control for a step regulator which substitutes integrated circuit components for the magnetic amplifier sensing means of known devices and thereby reduces the size and improves the sensitivity and reliability of the control.

These and other objects and advantages of the invention will be more readily apparent from the following detailed description when considered in conjunction with the accompanying drawing wherein:

FIG. 2 is a partial circuit diagram of an alternative embodiment of the invention.

DETAILED DESCRIPTION

Figure 1:
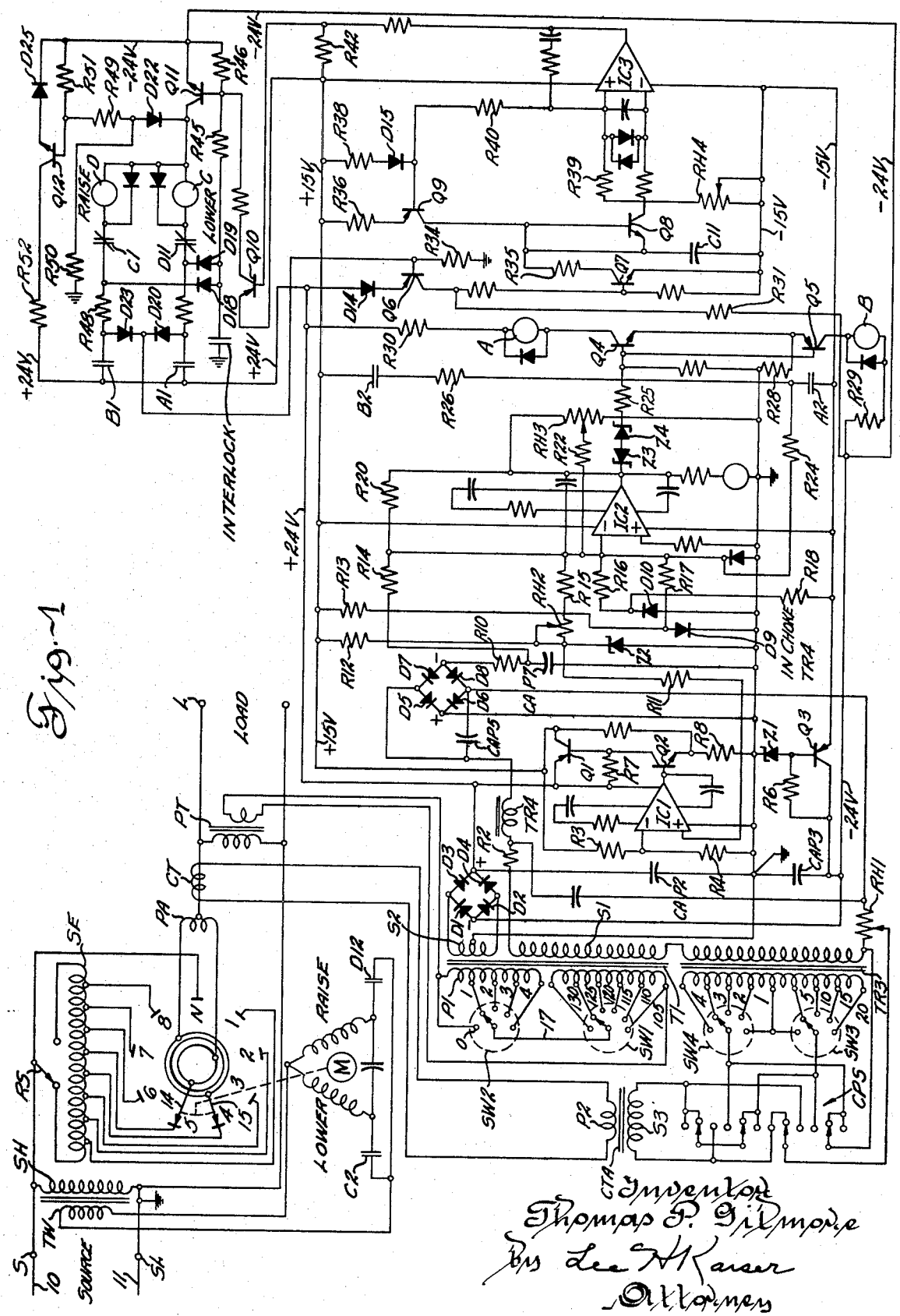
FIG. 1 is a circuit diagram of a preferred embodiment of the invention.

Referring to the drawing, a known step voltage regulator has an exciting winding SH connected across its S and SL terminals which are adapted to be connected to the conductors 10 and 11 of an alternating current power line to be regulated and a series winding SE connected in series with the line and provided with taps connected to the stationary contacts 1–8 and N of a tap changer switch arranged in a circle. The exciting winding SH is connected to the responsive ends of series winding SE by an automatic, mechanically operated reversing switch RS which reverses the polarity of the series winding SE and therefore doubles the range of the tap changer. Two rotatable contacts 14 and 15 of the tap changer switch are adapted to sequentially engage the stationary contacts 1–8 and N and are connected through slip rings to the opposite ends of a midtapped preventive autotransformer PA whose midtap is connected to the regulator terminal L which is adapted to be connected to the load. The tap changer rotatable contacts 14 and 15 are actuated by a reversible motor M in a first direction to raise the output voltage when the RAISE winding of motor M is energized and in the opposite direction to lower the output voltage of the step regulator when the LOWER winding of motor M is energized. The step voltage regulator may include a potential transformer PT connected between the midtap of the preventive autotransformer PA and the SL terminal so that it senses the voltage at the load side of the transformer, a current transformer CT connected between the midtap of the preventive autotransformer PA and the load bushing L so that it measures load current, and a tertiary, or auxiliary winding TW inductively coupled to the exciting winding SH.

The step regulator potential transformer PT supplies a measure of the step regulator output, or load voltage to the primary winding P1 of a potential sensing transformer T1 having a plurality of taps in the primary winding P1 to permit the selection of any load, or output voltage level between 105 and 134 volts in one volt steps by manual adjustment of a voltage setting rotary "coarse" switch SW1 and a voltage setting rotary "fine", or vernier switch SW2. Each of the switches SW1 and SW2 has a plurality of stationary contacts arranged in a circle and a movable contact adapted to engage the stationary contacts, and the movable contacts of the two switches SW1 and SW2 are electrically connected together by a conductor 17. Six of the taps in primary winding P1 are "coarse" taps at 5 volt spacings which provide regulator output potentials indicated as 105, 110, 115, 120, 125 and 130 volts and are individually connected to the stationary contacts of coarse switch SW1. Four of the taps are fine taps at one volt spacings indicated as 1, 2, 3 and 4 volts which are individually connected to the stationary contacts of vernier voltage setting switch SW2, and one stationary contact of fine switch SW2 marked "0" is connected to one end of primary winding P1. It will be appreciated that manual setting of "coarse" and "fine" switches SW1 and SW2 will short circuit the turns of primary winding P1 between the tops engaged by the movable switch contacts and thus permit selection of regulator output voltage from 105 to 134 volts in one volt steps.

Line Drop Compensation

Known line drop compensating means are provided which compensate for the line voltage drop between the step regulator and the load center and include a variable reactance element choke TR3 provided with taps for adjustment of the reactance component and a resistance element potentiometer RH1. An auxiliary current transformer CTA has its primary winding P2 in series with the step regulator current transformer CT which senses line current, and the secondary winding S3 of auxiliary current transformer CTA is connected in series with the resistance element potentiometer RH1 and the reactance element choke TR3 through a line drop compensator polarity switch CPS. One side of the secondary winding S3 of auxiliary transformer CTA is connected through the compensator polarity switch CPS to the slider of the resistance element potentiometer RH1. The tapped winding of the variable reactance element choke TR3 has four "coarse" taps designated 5, 10, 15, 20 volts respectively connected to the stationary contacts of a manual coarse reactance compensation switch SW3 and four vernier taps designated 1, 2, 3, 4 volts respectively connected to the stationary contacts of a manual vernier reactance compensation rotary switch SW4. The midtap of the tapped winding of reactance element choke TR3 is connected to a stationary contact of each of the switches SW3 and SW4. One end of resistance element rheostat RH1 is selectively connected through compensator polarity switch CPS to the movable contact of one of the reactance compensation rotary switches SW3 or SW4, and the movable contact of the other rotary switch SW3 or SW4 is connected through the compensator polarity switch CPS to the other side of the secondary winding S3 of auxiliary current transformer CTA.

The secondary winding S1 of potential sensing transformer T1 is connected in series with the winding of reactance element choke TR3 and the resistance element potentiometer RH1. When load current passes through the step voltage regulator main current transformer CT, it establishes current flow in the secondary winding S3 of auxiliary current transformer CTA which superimposes an additional current in the line drop compensator and produces a voltage drop which subtracts from that induced in the secondary winding S1 of potential sensing transformer T1. The resistance and reactance elements RH1 and TR3 are adjustable to be directly proportional to the actual line resistance and line reactance characteristics of the feeder being supplied by the regulator and may be adjusted by rheostat RH1 and reactance rotary switches SW3 and SW4 to add from 0 to 24 volt line drop in one volt steps. The potential provided by the line drop compensation means is inserted in series with the secondary winding S1 of the potential sensing transformer T1, and consequently the step regulator will automatically increase its output voltage as the load increases and thus compensates for the increasing voltage drop in the line. The current from the secondary winding S3 of auxiliary current transformer CTA IS proportional to line current and flows through the tapped windings of reactance element TR3 and the resistance element RH1, thereby producing a 90° lagging voltage across the choke TR3 and an in-phase voltage across rheostat RH1 which is subtracted directly from (or added directly to) the output voltage from the secondary winding S1 of potential sensing transformer T1 in known manner.

Secondary winding S1 of potential sensing transformer T1 is connected through a low pass filter to a full-wave bridge rectifier comprising diodes D5–D8. The low pass filter comprises a resistance R2, a choke TR4 and a capacitor CAP5 and eliminates the effects of third harmonics. The output of full wave rectifier D5–D8 passes through a ripple-removing resistance-capacitance filter comprising a resistance R10 and a shunt capacitor CAP7 and derives a negative DC signal at the junction of resistance R10 and capacitor CAP7 which is proportional to the voltage on the output side of the step regulator and is applied through an input resistance R14 to the inverting input of an error amplifier IC2. Error amplifier IC2 is preferably a high gain, low offset operational amplifier of the integrated circuit type such as sold by Motorola Company under the type designation MC1709 and is used as a summing amplifier so that its output voltage is proportional to the sum of its several input voltages.

Power Supply

Another secondary winding S2 on potential sensing transformer T1 has its midtap grounded and energizes a full wave bridge rectifier comprising diodes D1–D4 that supplies unregulated plus and minus 24 volt DC power for the control circuit. The unregulated power supply is used for operation of relays as described hereinafter to limit power dissipation in the voltage regulator. A capacitor CAP3 connected between the negative terminal of the full wave bridge rectifier D1–D4 and ground removes the ripple in the full wave rectified voltage, and the negative supply is regulated to −15 volts by a series regulator including a power transistor Q3 having its collector connected to the negative terminal of bridge rectifier D1–D4 and its base connected through a zener diode Z1 to ground and through a resistor R6 to its collector. Zener diode Z1 keeps the base of transistor Q3 at constant potential relative to ground and thus maintains the negative supply voltage from the emitter of transistor Q3 relatively constant. Transistor Q3 is used as an emitter follower with the zener diode Z1 controlling the base to ground bus voltage.

The ripple in the unregulated 24 volts from the positive terminal of full wave rectifier bridge D1–D4 is removed by a shunt capacitor CAP2 having one side connected to ground and flows through the emitter-collector circuit of a series power transistor Q1 which absorbs the voltage changes and supplies regulated 15 volt positive DC power at its collector to the +15 volt positive bus. A control resistor R7 is connected between the base and the emitter of series transistor Q1, and the emitter-base voltage of series transistor Q1 is established by the current flowing through control resistor R7. The voltage on the +15 volt positive supply bus at the collector of series transistor Q1 is applied through a resistance R3 to the inverting input of a high gain, low offset differential input operational amplifier IC1 which is preferably of the integrated circuit type sold commercially by Motorola Company under the designation MC1709. A resistor R12 is connected in series with a reference zener diode Z2 between the regulated 15 volt positive power supply and ground, and the reference voltage across zener diode Z2 is applied through a resistance R11 to the noninverting input of operational amplifier IC1. The output of operational amplifier IC1. is coupled to the base of an NPN transistor Q2 which operates in the active region and whose collector is connected to the base of series transistor Q1 and whose emitter is connected through a resistor R8 to ground. The positive supply bus voltage at the collector of series transistor Q1 is applied across a voltage divider comprising two resistances R3 and R4 connected in series to ground, and the junction of resistances R3 and R4 is coupled to the inverting input of amplifier IC1. If the fraction of the positive supply bus voltage derived at the junction of resistance R3 and R4 applied to the inverting input of amplifier IC1 is greater than the reference voltage from zener diode Z2 applied to its noninverting input, the output from amplifier IC1 applied to the base of NPN transistor Q2 will be negative so that decreased current flows through control resistor R7. This lowers the voltage drop across control resistor R7 which tends to lower the base current in series transistor Q1 and reduce the voltage at the collector of transistor Q1 so that the voltage on the +15 volt positive bus remains constant. If the fraction of the +15 volt supply bus voltage derived at the junction of resistances R3 and R4 applied to the inverting input of amplifier IC1 falls below the reference voltage applied to its noninverting input, the output of amplifier IC1 becomes positive and increases the forward bias on the base of transistor Q2 so that the current through its emitter-collector circuit and control resistor R7 increases, thereby increasing the base current to series transistor Q1 which increases its output voltage and tends to maintain the positive 15 volt supply constant. This constant 15 volt positive supply voltage keeps the bias current through the reference diode Z2 constant, thereby permitting use of a lower cost reference zener diode that would be required if it were necessary to compensate for voltage variations due to bias changes.

Voltage Sensing

A temperature compensation diode D9 positioned in the winding of choke TR4 has one side connected to the ground bus and its other side connected: (1) through a resistance R17 to the inverting input of summing, or error amplifier IC2, and (2) through a resistance R13 to the regulated 15 volt positive power supply bus. Diode D9 compensates for changes in copper resistance over the entire temperature range to which the control is subjected. A rectifier drop compensation diode D10 has one side grounded and its other side connected through a resistance R18 to the regulated −15 volt power supply and also connected through a resistance R16 to the inverting input of summing amplifier IC2. Rectifier drop compensation diode D10 is biased at the same current level as rectifiers D5–D8 and applies a negative voltage to said inverting input which cancels out the effect of changes of rectifier diode drop over the entire temperature range that the step regulator control operates. Summing amplifier IC2 receives six input signals on its inverting input, namely: (1) the rectified negative voltage from full-wave bridge D5–D8 proportional to the step regulator output voltage; (2) the positive reference voltage from zener diode Z2; (3) the positive voltage from copper temperature compensation diode D9; (4) the negative voltage from rectifier drop compensation diode D10; (5) signals through resistance R24 which create a differential between pick-up and drop-out of the reed relays A and B; and (6) a feedback signal from bandwidth setting potentiometer RH3. The output of summing amplifier IC2 is adjusted (preferably at the factory) to zero by potentiometer RH2 when a calibrated input potential is applied to the primary winding of sensing transformer T1. The adjustment of potentiometer RH2 is the only calibration required. The error sensing, summing amplifier IC2 produces an output which is proportional to the average of the fundamental line voltage variations across line conductors 10 rheostat RH3 11 and to the voltage bandwidth setting. The voltage bandwidth is established by a bandwidth setting rheostat RH3 which varies the gain of error amplifier IC2. Bandwidth setting rheostat RH3 has one side connected to the ground bus, its slider connected through feedback resistor R22 to the inverting input of summing amplifier IC2, and its other side connected to the output of summing amplifier IC2. The output of summing amplifier IC2 is also connected through a feedback resistance R20 to the inverting input. The feedback to summing amplifier IC2 is thus through a relatively high fixed resistance path R20 in parallel with a path which includes a portion of rheostat RH3 in series with the slider of rheostat RH3 and resistance R22. The output voltage from summing amplifier IC2 is applied across rheostat RH3 to ground. The fraction of such output voltage appearing across rheastat RH3 which is applied through resistance R22 to the inverting input varies as the slider of rheostat RH3 is adjusted, thereby varying the gain of summing amplifier IC3. The bandwidth is the narrowest when the slider of rheostat RH3 is at its lowest position so that the gain of summing amplifier IC2 is the highest and a small change in input voltage results in relatively high output voltage from amplifier IC2. As the slider of rheostat RH3 is moved up as seen in the drawing, a higher fraction of the amplifier output voltage developed across rheostat RH3 is applied through resistance R22 to the inverting input, the gain of amplifier IC2 is reduced, and a greater change in input voltage is required to provide the same amplifier output voltage, thereby increasing the voltage bandwidth. Summing amplifier IC2 tends to maintain the potential between its inverting and noninverting inputs at zero volts. When a relatively small fraction of the voltage across rheostat RH3 is fed back to the inverting input, the amplifier gain must be relatively high to provide sufficient output voltage swing to cancel a given input voltage by such feedback and thus maintain zero volts between the input terminals. However, when a higher fraction of the voltage across rheostat RH3 is fed back, the amplifier gain decreases but sufficient voltage is still fed back to cancel the same magnitude of input signal and thus maintain the potential between input terminals at zero volts.

If the power line voltage drops below the nominal potential at the center of the voltage bandwidth, summing amplifier IC2 produces a negative proportional to the difference between the line voltage and the nominal voltage at the center of the bandwidth. Conversely, a line voltage higher than the nominal voltage will provide a positive output voltage from summing amplifier IC2 proportional to the difference from the nominal voltage.

The output voltage from summing amplifier IC2 is coupled through two series-connected, oppositely poled zener diodes Z3 and Z4 and a resistance R25 to the bases of both an NPN transistor Q4 and a PNP transistor Q5. The emitter-collector circuit of transistor Q4 is connected in series with the operating coil of a reed relay A and two resistors R28 and R30 across the positive unregulated 24 volt supply from bridge rectifier D1–D4 to ground. When the regulator output voltage is above the upper bandwidth limit so that the output of summing amplifier IC2 is positive and exceeds the breakdown voltage of zener diode Z3 and the base-to-emitter drop of transistor Q4, the base of NPN transistor Q4 becomes forward biased and it conducts to operate relay A. Similarly, the emitter-collector circuit of PNP transistor Q5 is connected in series with the operating coil of a reed relay B and two resistors R29 and R28 across the negative unregulated 24 volt supply to ground. When the regulator output voltage is beyond the lower bandwidth limit so that the output of summing amplifier IC2 is negative and exceeds the breakdown voltage of zener diode Z4 and the base-to-emitter drop of transistor Q5, the base of PNP transistor Q5 becomes forward biased and it conducts to operate relay B.

Operation of relay A: (1) closes a first set of normally open contacts A1 to prepare an energizing circuit to motor control LOWER power relay C, and (2) closes a second set of normally open contacts A2 to connect the negative 15 volt supply bus through a calibrating resistor R24 to the inverting input of error amplifier IC2 to cause the output voltage from summing amplifier IC2 to become more positive and thus hold transistor Q4 in the conductive state. The effect is to raise the drop-out potential of relay A above its pick-up potential to thereby prevent hunting. Similarly, operation of relay B: (1) closes a first set of normally open contacts B1 to prepare an energizing circuit to motor control RAISE power relay D; and (2) closes a second set of normally open contacts B2 to connect the positive 15 volt supply bus through a calibrating resistor R26 to the inverting input of summing amplifier IC2 to supply an offset voltage thereto which causes the output voltage from summing amplifier IC2 to become more negative and thus hold transistor Q5 in the conductive state. The application of positive and negative offset voltages by relay contacts A2 and B2 respectively to the inverting input of summing amplifier IC2 thus, in effect, controls the pick-up and drop-out differential of reed relays A and B.

Timer

Operation of either relay A or B also starts the RC timer which includes a timing capacitor C11 having one electrode connected to the regulated 15 volt negative supply bus and its other electrode connected to the collector of a charging current transistor Q9. Timing capacitor C11 is normally shunted by the series arrangement of a resistance R35 and the collector-emitter circuit of a PNP shunting transistor Q7 which is normally turned on so that timing capacitor C11 cannot charge.

The emitter of a PNP transistor Q6 is connected through a diode D14 to positive unregulated 24 volt supply bus so that the emitter is more positive than its base which is coupled through a resistance R34 to ground, and transistor Q6 normally conducts. When transistor Q6 conducts, the base of shunting transistor Q7 is forward biased so that it is turned on and short circuits timing capacitor C11.

The timing cycle is initiated by operation of one of the reed relays A or B which closes its respective contacts A1 or B1. Assuming that relay A operates, the closing of contacts A1 connects the positive unregulated 24 volt supply bus through a diode D20 to the base of transistor Q6 which reverse biases it and turns it off. The turning of transistor Q6 off lowers the potential on the base of NPN shunting transistor Q7 and turns it off so timing capacitor C11 can begin to charge from the regulated 15 volt positive supply bus through resistor R36 and the emitter-collector circuit of charging current transistor Q9. Potential then builds up on timing capacitor C11 proportional to the charging current flowing through transistor Q9.

A differential input operational amplifier IC3 of the integrated circuit type sold by the Motorola Company under the designation MC1709 serves as a comparator to compare the potential on timing capacitor C11 with the voltage set by time delay adjusting rheostat RH4. Timing capacitor C11 is coupled through a transistor Q8 to the inverting input of comparator amplifier IC3. The noninverting input of comparator amplifier IC3 is coupled to the junction of two voltage divider resistors R39 and R40 which are connected in series with a resistor R38, a diode D15, and time delay adjusting rheostat RH4 across the +15 volt positive bus and the −15 volt negative bus of the regulated supply.

The base of a PNP transistor Q10 is coupled through a resistor R42 to the 15 volt positive supply so that it normally is reverse biased and turned off. A NPN transistor Q11 is also normally reverse biased to the nonconducting state because its base is coupled through a resistance R46 to the −24V bus and its collector is connected to ground through a diode D22 in series with a resistance R50.

When the voltage across timing capacitor C11 coupled to the inverting input of comparator amplifier IC3 is equal to the voltage manually established at the noninverting input by the setting of time delay adjusting rheostat RH4, the output of comparator amplifier IC3 becomes negative and forward biases the base of transistor Q10 and turns it on. Conduction by transistor Q10 clamps the base of NPN transistor Q11 to the +15 volt supply bus so that it also turns on and completes an energizing circuit to LOWER relay C or RAISE relay D through its collector-emitter circuit to the −24 volt bus.

If relay A is operated when the output of comparator amplifier IC3 goes negative and turns transistors Q10 and Q11 on, an operating circuit for LOWER power relay C is completed from the unregulated 24 volt positive bus through contacts A1, normally closed contacts D11 of relay D, the operating coil of LOWER relay C, and the collector-emitter circuit of transistor Q11 to the negative 24 volt bus. LOWER power relay C then operates and closes its contacts C2 to complete an energizing circuit from auxiliary winding TW to the LOWER winding of motor M, and also opens its contacts C1 to open the operating circuit to relay D. If relay B is operated when the output of comparator amplifier IC3 goes negative and turns on transistors Q10 and Q11, an operating circuit for RAISE power relay D is completed from the 24 volt positive bus through contacts B1, resistance R48, normally closed contacts C1, the operating coil of RAISE relay D, and the collector-emitter circuit of transistor Q11 to the negative 24 volt bus. RAISE relay D the n closes its contacts D12 to complete an energizing circuit from auxiliary winding TW to the RAISE winding of motor M and also opens its contacts D11 to open the operating circuit to LOWER relay C.

As described above, comparator amplifier IC3 compares the voltage on timing capacitor C11 to a voltage set by time adjusting rheostat RH4, and when the two voltages are equal, amplifier IC3 switches transistors Q10 and Q11 on. It will be noted that both the charging current to timing capacitor C11 flowing through transistor Q9 and the voltage to which timing capacitor C11 is allowed to charge are simultaneously varied by adjustment of rheostat RH4 to obtain the wide time range desired. This follows since as the potential to which capacitor C11 charges is varied, the bias on the collector of charging current transistor Q9 also changes so that the magnitude of charging current changes simultaneously with the timing capacitor voltage which switches comparator amplifier IC3. Such arrangement allows use of a time delay adjusting potentiometer RH4 of low ohmic value to permit selection of a wide range of time delay intervals and also permits use of low cost commercially available components.

Interlock

An interlock circuit which insures that the tap change will be completed regardless of changes in output voltage from the voltage regulator includes a pair of normally open INTERLOCK contacts which are closed by a cam (not shown) operated by the tap changer motor M in both the raise and lower directions, a resistance R45 connected between the INTERLOCK contacts and the base of transistor Q11, and two diodes D18 and D19 connected between the INTERLOCK contacts and the relay contacts C1 and D11 respectively. The INTERLOCK contacts close at the start of a tap change to: (1) ground the base of NPN transistor Q11 through resistance R45 so that it remains conducting and; (2) complete another operating circuit through diode D18 or D19 to the operating coil of the energized RAISE relay or LOWER relay to maintain it operating until the tap change is completed even if relay A or relay B releases and opens contacts A1 or B1.

As described hereinbefore, power for the control is supplied by the bridge rectifier D1–D4 which is energized from a secondary winding S2 on the voltage sensing transformer T1. When a relay of the control operates, the resulting variation in load current is reflected to the voltage sensing secondary winding S1 of transformer T1 due to leakage reactance and the resistance of the primary winding P1. The control of the invention maintains a constant load current at all times to minimize such changes in sensed voltage which would otherwise occur when a relay operates or releases. A first load current compensating resistor R31 is connected between the −24 volt supply bus and the collector of normally conducting transistor Q6 and is switched out of the circuit when either reed relay relay A or B operates and turns off transistor Q6, thereby preventing variation in load current. A second load current compensating resistor R52 is connected between the +24 volt supply bus and the collector of a normally conducting NPN transistor Q12 whose emitter is connected through a diode D25 to the −24 volt supply bus and whose base is connected through a resistance R49 and a diode D22 to the collector of transistor Q11 and also through resistances R49 and R50 in series to ground. It will be recalled that the negative output from comparator amplifier IC3 at the end of the timing cycle turns on transistors Q10 and Q11 to effect operation of LOWER power relay C or RAISE power relay D, and conduction by transistor Q11 clamps the base of NPN transistor Q12 to the −24 volt supply bus to turn it off, thereby switching resistor R52 out of the circuit so the load current remains constant when power relay C or D operates.

The preferred embodiment has been described as having rheostat means RH3 to vary the gain of the summing amplifier IC2 to change voltage bandwidth. However, it will be appreciated that in alternative embodiments the gain of summing amplifier IC2 can remain constant if switching means are coupled to the output of the summing amplifier in place of the zener diodes Z3 and Z4 which can be selectively biased to regulate the turn-on point and thus adjust the voltage bandwidth.

FIG. 2 is a partial circuit diagram of an alternative embodiment in which the voltage sensing means is similar to that of the preferred embodiment but which differs from the FIG. 1 circuit in that: (1) the polarity and magnitude sensing means (zener diodes Z3 and Z4 and transistors Q4 and Q5) of the preferred embodiment are replaced by a pair of differential input operational amplifiers IC4 and IC5 which may be of the integrated circuit type, a pair of diodes D30 and D31, and a NOT gate NOT1; and (2) the reed relays A and B of the preferred embodiment are replaced by a logic circuit including a pair of NAND gates NAND1 and NAND2.

The output of summing amplifier amplifier IC2 is coupled through resistances R60 and R61 respectively to the inverting inputs of amplifiers IC4 and IC5. The noninverting inputs of differential input amplifiers IC4 and IC5 are coupled to ground through resistances R63 and R64 respectively, and the inverting inputs of differential input amplifiers IC4 and IC5 may be connected through resistances R66 and R67 respectively to positive and negative terminals V+ and V− of a suitable power supply.

The negative output of differential amplifier IC4 is normally shunted to ground by diode D30 so that logic 0 voltage is applied to the A input of gate NAND1 and to an adjustable time delay circuit TIMER shown in block form which may be similar to the timer of FIG. 1. The resulting logic 1 voltage output of gate NAND1 is schematically shown as coupled to one side of the operating coil of power RAISE relay D with the other side of the operating coil connected to the positive terminal +V of the power supply so that relay D is normally released. The positive output of differential input amplifier IC5 is normally converted by gate NOT1 to logic 0 voltage which is applied to the C input to gate NAND2 and to an input of the adjustable time delay circuit TIMER. The resulting logic 1 output of gate NAND 2 is schematically shown as coupled to one side of the operating coil of power LOWER relay C with the other side of the operating coil connected to the positive terminal +V so that relay C is normally released. The output of time delay circuit TIMER is coupled to the B input of both gates NAND1 and NAND2. The output of gate NAND1 is coupled to the A input of gate NAND2, and the output of gate NAND2 is coupled to the C input to gate NAND1 so that the gate outputs are cross connected to prevent relays C and D from operating simultaneously.

When the regulator output voltage is beyond the lower bandwidth limit so that the output of summing amplifier IC2 is negative and greater that voltage +V coupled to the inverting input of amplifier IC4, the output of amplifier IC4 goes positive and applies logic 1 voltage to input A of gate NAND1 and to the TIMER. After the preselected time delay, the output of TIMER goes to logic 1 voltage so that all inputs to gate NAND1 are logic 1. The output of gate NAND1 then goes to logic 0 to operate relay D which close contacts D2 to thereby connect auxiliary winding TW to the RAISE winding of motor M so that tap changer contacts 14 and 15 are actuated in a direction to raise the output voltage from the voltage regulator.

When the regulator output voltage is above the upper bandwidth limit so that the output of summing amplifier IC2 is positive and greater in magnitude than voltage −V applied to the inverting input of differential amplifier IC5, the output of amplifier IC5 goes negative and is converted by gate NOT1 to logic 1 voltage which is applied to the C input of gate NAND2 and to the time delay circuit TIMER. After the preselected time delay internal, the output of TIMER becomes logic 1 voltage so that all inputs to gate NAND2 are logic 1, and its output becomes logic 0. Power LOWER relay C then operates and closes contacts C2 to connect auxiliary winding TW to the LOWER winding of motor M which actuates tap changer contacts 14 and 15 in a direction to lower the output voltage from the voltage regulator.

It will be appreciated that the means for selectively adjusting the gain of summing amplifier IC2 to regulate the bandwidth limits can be omitted in this embodiment and the upper and lower bandwidth limits can be regulated by varying the magnitude of the voltages +V and −V applied to the inverting inputs of amplifiers IC4 and IC5.

It should be understood that I do not intend to be limited to the particular embodiments shown and described for many modifications and variations thereof will be readily apparent to those skilled in the art.

The embodiments of the invention in which an exclusive property or privilege is claimed are defined as follows:

1. In a control for a step regulator having means to raise and lower the regulator output voltage when a raise signal and a lower signal respectively is applied thereto, in combination,
   a summing operational amplifier,
   sensing means for deriving a sample DC voltage which is a function of the regulator output voltage, said sensing means being coupled to one input of said summing amplifier,
   means for deriving a DC reference voltage of opposite polarity to said sample voltage, said reference voltage deriving means being coupled to said one input of said summing amplifier, whereby the output of said summing amplifier is zero when said sample and reference voltages are equal and is positive or negative dependent upon the relative magnitude of said sample and reference voltages,
   means responsive to the polarity of the output voltage from said summing amplifier and being operated when a preselected magnitude of input voltage is present on said one input of said summing amplifier for respectively deriving said raise and lower signals when said regulator output voltage is beyond the lower and upper bandwidth limits, and
   voltage bandwidth adjusting means for selectively varying the magnitude of said input voltage which must be applied to said one input of said summing amplifier to operate said raise and lower signal deriving means to thereby regulate the voltage bandwidth within which the output voltage of said step regulator is maintained.

2. In a control for a step regulator in accordance with claim 1 wherein said voltage bandwidth adjusting means comprising means for adjusting the gain of said summing amplifier.

3. In the combination of claim 2 wherein said means for varying the gain of said summing amplifier includes a rheostat across which the output of said summing amplifier is applied and a resistance coupled between the contact arm of said rheostat and said one input of said summing amplifier.

4. In the bombination of claim 2 wherein said raise and lower signal deriving means includes a NPN and a PNP transistor having electrically commoned bases and a pair of serially arranged, oppositely poled zener diodes coupled between the output of said summing amplifier and the electrically commoned bases combination said NPN and PNP transistors.

5. In the combination of claim 4 wherein said one input of said summing amplifier is the inverting input and the noninverting input of said summing amplifier is coupled to ground and said raise and lower signal deriving means also includes first and second relays one of which has an operating coil in series with the emitter-collector circuit of said NPN transistor and the other of which has an operating coil in series with the emitter-collector circuit of said PNP transistor and first and second offset voltage circuit means each of which is completed by operation of one of said relays for applying a positive and a negative offset DC voltage respectively to said inverting input of said summing amplifier.

6. In the combination of claim 2 and including means actuated in response to operation of said raise and lower signal deriving means for respectively coupling DC offset voltages of opposite polarity to said one input of said summing amplifier when said raise and lower voltages are derived.

7. In the combination of claim 2 wherein said means for deriving a reference voltage includes a zener diode and said control includes series regulator means for deriving a regulated DC power supply and wherein said reference voltage zener diode is energized from said regulated DC power supply.

8. In the combination of claim 7 wherein said series regulator means includes a differential input second operational amplifier and the voltage across said reference voltage zener diode is coupled to one input of said second operational amplifier.

9. In the combination of claim 2 wherein said means for deriving a sample DC voltage includes a choke coil and said control also includes temperature compensation diode means positioned within said choke coil and coupled to said one input of said summing amplifier for compensating for changes in resistance of components of said control resulting from variations in temperature to which said control is subjected.

10. In the combination of claim 2 wherein said means for deriving a sample DC voltage includes a full wave rectifier bridge and said control also includes rectifier drop compensating diode means coupled to said one input of said summing amplifier for canceling variations in voltage drop across rectifiers of said bridge caused by temperature variations to which said control is subjected.

11. In the combination of claim 5 wherein said means for deriving raise and lower signals also includes RC time delay means for providing a preselected time delay between the turning on of either of said transistors and the generation of the corresponding raise or said lower signal.

12. In the combination of claim 11 wherein said RC time delay means includes a differential input comparator operational amplifier, adjustable means including a time delay setting rheostat for applying a preselected voltage to one input of said comparator operational amplifier, a timing capacitor having one electrode coupled to the other input of said comparator operational amplifier, and means responsive to the turning on of either of said transistors for initiating charging of said timing capacitor in series with a resistance from a DC power supply, whereby the output of said comparator operational amplifier changes to the opposite polarity when the potential across said timing capacitor builds up to said preselected voltage.

13. In the combination of claim 12 wherein said means for deriving raise and lower signals also includes raise and lower relays, means responsive to the operation of one of said first and second relays and to said opposite polarity output of said comparator operational amplifier for energizing said raise relay, and means responsive to the operation of the other of said first and second relays and to said opposite polarity output of said comparator operational amplifier for energizing said lower relay.

14. In the combination of claim 12 wherein said summing operational amplifier and said comparator operational amplifier are of the integrated circuit type.

15. In the combination of claim 12 wherein said means for initiating charging of said timing capacitor includes a charging current transistor through which the charging current flows to said timing capacitor and means for biasing said charging current transistor in a direction to vary the magnitude of charging current flowing therethrough as a function of the voltage built up on said timing capacitor.

16. In the combination of claim 2 wherein said raise and lower signal deriving means includes first and second polarity and magnitude sensing means operable when the output voltage from said summing amplifier reaches a predetermined magnitude and is of positive and negative polarity respectively, an adjustable timer for providing a timer output signal a preselected time delay after it is triggered and being triggered upon operation of said first or said second polarity and magnitude sensing means, a first relay and a second relay, and
means responsive to the operation of said first polarity and magnitude sensing means and said timer output signal for operating said first relay and being responsive to the operation of said second polarity and magnitude sensing means and said timer output signal for operating said second relay.

17. In the combination of claim 16 wherein said adjustable timer has an RC timing circuit including a timing capacitor, means for providing said timer output signal when the voltage across said timing capacitor builds up to a preselected potential, and time delay setting means for simultaneously adjusting both the magnitude of charging current to said timing capacitor and the potential across said timing capacitor at which said timer output signal is provided.

18. In the combination of claim 17 wherein said timer includes a differential input comparator operational amplifier, a charging current transistor connected in said RC charging circuit, means including a time setting rheostat for applying a preselected voltage to one input of said comparator amplifier, means for applying the voltage across said timing capacitor to the other input of said comparator amplifier, and biasing means for varying the charging current flowing through said transistor as a function of the voltage across said timing capacitor.

19. In the combination of claim 16 wherein said first and second polarity and magnitude sensing means includes a pair of serially connected, oppositely poled zener diodes coupled to the output of said summing amplifier.

20. In the combination of claim 16 wherein said first polarity and magnitude sensing means includes a differential input second operational amplifier having its inverting input coupled to the output of said summing amplifier and also connected to a DC voltage source of predetermined positive potential, and said second polarity and magnitude sensing means includes a differential input third operational amplifier having its inverting input coupled to the output of said summing amplifier and also connected to a DC voltage source of predetermined negative potential.

21. In the combination of claim 20 wherein said means for operating said first relay includes a first NAND gate receiving said timer output signal on one input and having another input coupled to the output of said second operational amplifier and being connected to the cathode of a diode whose anode is grounded, and said means for operating said second relay includes a second NAND gate receiving said timer output signal on one input and having another input coupled through a NOT gate to the output of said third operational amplifier with the input to said NOT gate connected to the cathode of a diode whose anode is grounded.

22. In the combination of claim 16 and including means actuated in response to the operation of said first and second polarity and magnitude sensing means respectively for coupling DC offset voltages of opposite polarity to said one input of said summing amplifier.

23. In a control for a step voltage regulator having means to raise and lower the regulator output voltage when a raise and a lower signal respectively is applied thereto, in combination,
   sensing means for deriving a DC sample voltage which is a function of the regulator output voltage,
   means for deriving a DC reference voltage having a polarity opposite to said sample voltage,
   a summing operational amplifier having one input coupled to both said sensing means and to said reference signal deriving means,
   a NPN and PNP transistor,
   a pair of oppositely poled, series connected zener diodes coupled between the output of said summing amplifier and the bases of said NPN and PNP transistors,
   first and second relays each of which has an operating coil in series with the emitter-collector circuit of one of said transistors,
   offset voltage circuit means for applying DC offset voltages of opposite polarity to said one input of said summing amplifier in response to operation of said first and second relays respectively, and
   raise and lower signal generating circuit means including RC time delay means for deriving said raise and lower signals after a time delay in response to operation of said first and second relays respectively.

24. In the combination of claim 23 and including means for selectively adjusting the gain of said summing operational amplifier to thereby regulate the bandwidth within which the output voltage of said regulator is maintained.

25. In the combination of claim 24 wherein said gain adjusting means includes a rheostat across which the output of said summing amplifier is applied and a resistance coupled between the contact arm of said rheostat and said one input of said summing amplifier.

26. In the combination of claim 23 wherein said RC time delay means includes a differential input second comparator operational amplifier, a timing capacitor coupled to one input of said comparator amplifier, means for applying a preselected DC voltage to the other input of said comparator amplifier, and means responsive to operation of said first or of said second relay for initiating charging of said timing capacitor in series with a resistance from a DC power source, whereby the output of said comparator amplifier changes to the opposite polarity when the potential across said timing capacitor builds up to said predetermined DC voltage.

27. In the combination of claim 26 wherein said means for initiating charging of said timing capacitor includes a charging current transistor in series with said resistance and said timing capacitor, said RC time delay means includes means for varying the bias on said charging current transistor as a function of the voltage across said timing capacitor, and said means for applying a preselected DC voltage to the other input of said comparator amplifier includes a time delay setting rheostat adapted to adjust said DC voltage applied to said other input.

28. In the combination of claim 27 and wherein said raise and lower signal generating means includes a raise relay and a lower relay and means responsive to both said opposite polarity output of said comparator amplifier and operation of said first and second relays respectively for energizing said raise and lower relays.

29. In the combination of claim 28 wherein said summing and comparator operational amplifiers are of the integrated circuit type.

30. In the combination of claim 23 wherein said means for deriving a DC reference voltage includes a reference voltage zener diode and said control also includes a series regulator including a diffeRential input second operational amplifier for deriving a regulated power supply, and wherein said reference voltage zener diode is energized from said regulated power supply and is also coupled to one input of said differential input second operational amplifier.

31. In the combination of claim 23 wherein said means for deriving a DC reference voltage includes a choke coil and said control also includes temperature compensation diode means positioned in said choke coil and coupled to said one input of said summing operational amplifier for compensating for changes in resistance of components of said control resulting from variations in temperature to which said control is subjected.

32. In the combination of claim 26 wherein said means for initiating charging of said timing capacitor includes a short circuiting transistor in shunt to said timing capacitor, means for normally biasing said short circuit transistor in the conductive state, and means responsive to the operation of said first or of said second relay for biasing said short circuiting transistor to the nonconductive state.

* * * * *